Oct. 1, 1963     H. P. ARMSTRONG     3,105,274
MULTIPLE GLASS PANE GLAZING UNIT AND METHOD OF FABRICATION
Filed May 19, 1961     2 Sheets-Sheet 1
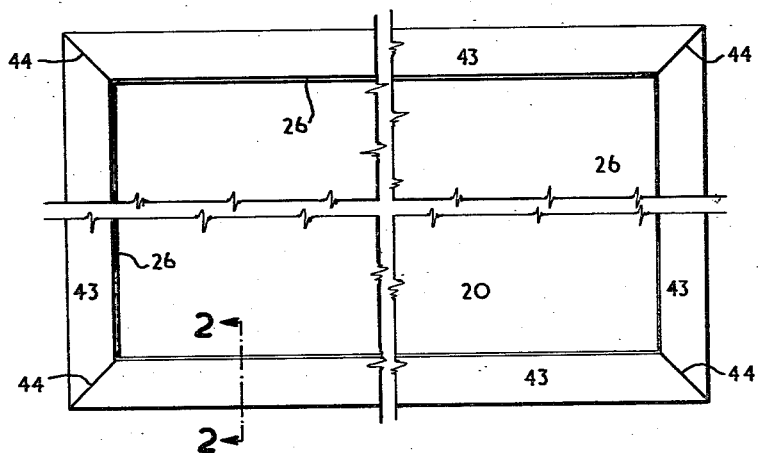
FIG. 1.
FIG.4.
FIG.5.
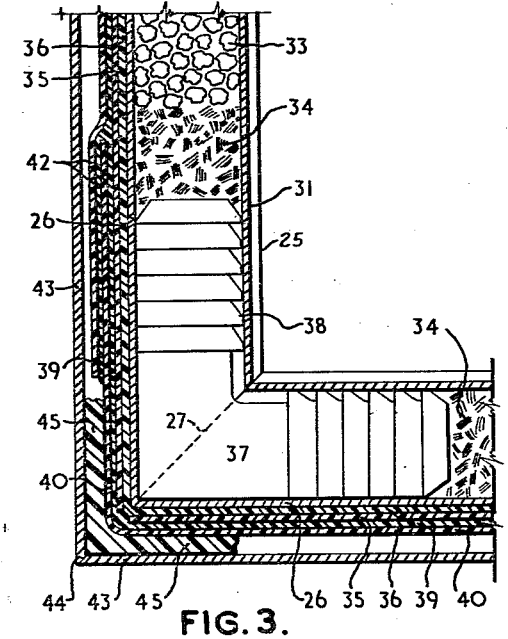
FIG.3.
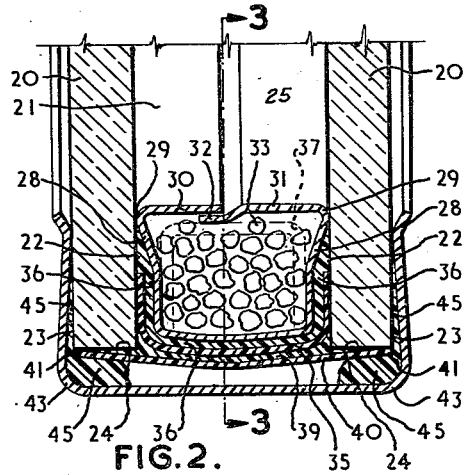
FIG.2.
INVENTOR
HENRY PAUL ARMSTRONG
ATTORNEY Oct. 1, 1963  H. P. ARMSTRONG  3,105,274
MULTIPLE GLASS PANE GLAZING UNIT AND METHOD OF FABRICATION
Filed May 19, 1961  2 Sheets-Sheet 2

INVENTOR
HENRY PAUL ARMSTRONG
ATTORNEY

United States Patent Office 3,105,274
Patented Oct. 1, 1963

3,105,274
MULTIPLE GLASS PANE GLAZING UNIT AND METHOD OF FABRICATION
Henry Paul Armstrong, Islington, Ontario, Canada, assignor to Armstrong Patents Limited, Toronto, Ontario, Canada, a corporation of Ontario
Filed May 19, 1961, Ser. No. 122,365
13 Claims. (Cl. 20—56.5)

This invention relates to improvements in multiple glass pane glazing units and to a novel method of fabricating same.

The general type of insulating glass unit with which this invention is concerned consists of two or more spaced glass panes which, preferably, are hermetically sealed about the perimeter thereof to form a dead air space or chamber between two glass panes. Such multiple insulating glass units are well known and are extensively used to reduce heat transfer and to prevent or reduce moisture vapour condensation.

Specifically, the present invention has to do with that type of multiple pane glazing unit which embodies two glass panes, a spacer frame interposed between internal marginal edge surfaces of the said glass panes, and adhesive sealing compound forming moisture vapour diffusion resistant seals between the sides of the said spacer frame and the adjacent glass panes. The spacer frame may be at least partially hollow and contain a dehydrating substance in communication with the space between the said glass panes, or an auxiliary dehydrating unit may be associated with the spacer frame.

In a multiple glass pane glazing unit of the aforesaid type, it is essential that the sealing compound be particularly stable to thermal and ultra-violet change; provide adequate adhesion and sealing contact with both metal and glass surfaces; and possess a very low moisture vapour diffusion factor. A mastic composition formed by incorporating carbon black with polyisobutylene in appropriate proportions provides optimum physical characteristics for the seals of such units, as is evidenced by extensive commercial production and installation of insulating glass units embodying edge seals of this general type or classification.

The manufacture of multiple glass pane glazing units of the aforesaid type, incorporating mastic edge seals of the character defined, presents a number of fabrication production problems, particularly under circumstances where a very wide range of glass specifications and unit sizes are manufactured. This virtually necessitates manual application of the seal films and assembly of the units by hand. Units of this type generally embody thin films of adhesive sealing compound formulated to provide adequate adhesion to metal and glass and the stability necessary to prevent slippage of one glass pane in relation to the other. Conversely, the films of compound must be sufficiently thick to accommodate wave distortion and irregularities in the glass surfaces and it has been found that the sealing compound frequently extrudes from between vertical glass and metal surfaces under the action of plastic flow, thus destroying the original seal and producing unsightly smearing on interior glass surfaces adjacent the spacer frame.

In addition to the foregoing, in the fabrication of such multiple glass pane glazing units, much difficulty is encountered in the application of the sealing compound films. Generally, the sealing compound is extruded under very substantial pressure on to non-adhesive or slightly adhesive tapes. Such tapes are applied, usually by hand, to either the sides of the spacer frame or to the marginal edge surfaces of the glass panes, following which the tapes are stripped off after adhesion of the sealing compound is attained, and great care must be exercised to preclude the possibility of fracture of the film during this operation. The glass panes and spacer frame are then adjoined, and again great care must be exercised to avoid damage of the adhesive films, or smearing of the sealing compound over the internal marginal edge surfaces of the glass panes.

In an attempt to avoid the aforesaid fabrication complexities, methods have been established in which thin strips or films of adhesive sealing compound are machine extruded directly on to marginal edge surfaces of the glass panes. This method involves a great deal of additional handling of the glass sheets and introduces the additional problem of properly joining the ends of the adhesive sealing compound strips or films, in order to provide continuous films of uniform thickness. Other fabrication methods have been developed in which the strips or films of adhesive sealing compound are applied directly to sides of or in grooves extending longitudinally of the spacer frame sections prior to assembly of same in the form of a unitary spacer frame, or to the sides of assembled spacer frames. While this method avoids the difficulties inherent to the method of direct application of the sealing compound films to marginal edge surfaces of the glass panes, it does not overcome the problem of providing films of adhesive sealing compound of uniform thickness and unbroken continuity.

The efficiency and success of this type of glazing unit has heretofore been dependent largely on maintaining the space between the glass panes hermetically sealed, since, should the seal be broken or develop even the slightest leak permitting atmospheric air to enter, the units will exhibit moisture vapour condensation on an inside surface of the glass. The leak may be so infinitesimal that it is undetectable by standard manufacturing tests used to determine whether or not newly produced units are adequately sealed.

Cognizant of the foregoing, the primary object of this invention is to provide a multiple glass pane glazing unit embodying a flexible edge seal including films of adhesive sealing compound which provide optimum physical characteristics and which will remain unimpaired after assembly, and which will flex and accommodate expansion, contraction and the "breathing action" of the unit resulting from atmospheric pressure and temperature changes, without rupture or degradation of the edge seal.

This invention is further characterized by the provision of a method of fabricating multiple glass pane glazing units of the aforesaid character, the edge seals of which may be very rapidly applied with accuracy and facility, with the minimum of attendant risk of producing improperly sealed units.

One preferred form of my present invention comprises a multiple glass pane glazing unit embodying an edge seal formed of three different types of mastic sealing compound, including a primary seal interposed between the sides of the spacer frame and confronting internal marginal edge surfaces of the glass panes, composed of a film of sealing compound characterized by a low moisture vapour diffusion factor combined with virtually negative plastic flow characteristics and good adhesion to metal and glass; a secondary seal overlying the aforesaid sealing compound, formed of a relatively soft adhesive sealing compound possessing permanent elasticity and good adhesion combined with an unusually low moisture vapour diffusion factor; and thirdly a cover for the said secondary seal comprising metal edging bonded to the external marginal edge surfaces of the glass panes with a permanently elastic sealant characterized by strong adhesion, the said sealant forming a flexible bond between the said metal edging and edges of the glass panes, which serves to prevent slippage of one glass pane in relation to the other, and provides a resilient cushion which will absorb shock and vibration, and also permit relative movement of the unit components resulting from atmospheric pressure and temperature fluctuations.

The invention is further characterized by the provision of a unique and novel primary edge seal per se, and by its method of fabrication and application. A preferred embodiment of the invention includes a spacer frame comprising four tubular sections having mitered ends and interlocking corner connectors. A strip of adhesive sealing compound of the aforesaid character is machine extruded on to suitable flexible material, for example, polyethylene tape. The said tape and adhering sealing compound is then cut into lengths, slightly longer than the tubular sections of the spacer frame. The said coated tapes are then mechanically applied under slight pressure to the external edges and portions of the sides of the respective tubular sections before assembly of the latter. The ends of the said tapes are then sheared to match the mitered ends of the said tubular sections, which are then assembled into a unitary frame. Since the polyethylene tape covers the greater part of the said strips of adhesive sealing compound, the separator frame may be assembled and thereafter handled with facility, without deforming or imparing the said strips of adhesive sealing compound. The assembled spacer frame is then placed between marginal edge surfaces of two glass panes, and the edges thereof are urged one towards the other, thereby deforming the strips of adhesive sealing compound and causing same to squeeze out from between the sides of the spacer frame and the overlying tapes, and form continuous monolithic seals between the sides of the said spacer frame and the adjacent glass panes.

In the preferred embodiment of this invention, following the aforesaid fabrication and assembly operations, the peripheral edges of the said spacer frame and the glass panes are then sealed with a secondary seal. The latter seal may be formed of a soft, tacky adhesive sealing compound of the character above defined, and machine extruded on to flexible material, for example, polyethylene tape. This tape may be applied in one length, or in a plurality of lengths, around the perimetrical edges of the glass panes, and after application may be pressed by hand-roller into intimate contact with the perimetrical edges of the glass panes. The ends of the tapes may be overlapped to provide joints and due to the soft, tacky nature of the adhesive sealing compound, hermetically sealed joints may be provided with facility. By using transparent polyethylene tape, the aforesaid applied seal may be visually inspected to determine its adequacy.

In that the primary seal is formed in the manner above defined and embodies an adhesive sealing compound substantially devoid of cold flow characteristics, and furthermore, since the said polyethylene tape overlies part of the aforesaid sealing compound and is urged into intimate contact between the latter and the adjacent glass pane surfaces, it is virtually impossible for the soft, tacky adhesive sealing compound used in the secondary seal to flow past the polyethylene tape and the adhesive sealing compound of the primary seal. This design characteristic permits the use of a soft, tacky adhesive sealing compound for the secondary seal possessing cold flow characteristics which would ordinarily prevent its use directly between a spacer frame and adjacent glass surfaces. By using a soft, tacky adhesive sealing compound, fabrication of the secondary seal is expedited and facilitated. Since the adhesive sealing compound of the secondary seal is completely enclosed and is not exposed to the air there will be no degradation of its resilient and adhesive characteristics.

It is desirable that the aforesaid secondary seal be properly protected against damage in handling, transportation and installation, by a suitable covering, which may comprise metal edging bonded to the external marginal edge surfaces of the aforesaid glass panes, with a durable permanently elastic adhesive sealing compound overlying the edges of the said secondary seal and acting as an additional or third moisture vapour migration seal.

Additional objects and advantages of this invention relating to the product and its method of fabrication, will become more apparent upon perusal of the following detailed description in conjunction with the accompanying drawings, in which:

FIGURE 1 is a fragmental elevation of the sealed multiple glazed unit, drawn at a reduced scale in relation to the various sectional and component views.

FIGURE 2 is a cross-sectional view of the edge seal, on section line 2—2 of FIGURE 1.

FIGURE 3 is a fragmental vertical sectional elevational view of one corner of the unit, as viewed on the plane designated by the section line 3—3 of FIGURE 2.

FIGURE 4 is a cross-section of the primary seal tape with an applied strip of sealing compound.

FIGURE 5 is a cross-section of the secondary seal tape with an applied film of sealing compound.

Figure 7:
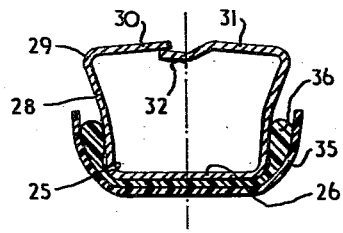
FIGURE 7 is a cross-section of the spacer frame showing application thereto of the seal tape and sealing compound, shown in FIGURE 4, and the first step of unit fabrication and assembly.

To facilitate reading of the drawings, the cross-sectional thickness of the various components forming the edge seal has been magnified beyond actual scale and desired proportions, which are hereinafter generally defined.

Referring to the drawings in detail, two glass panes 20 are arranged in substantially parallel relation, with an air space 21 therebetween. The glass panes 20 may be drawn sheet or polished plate, or any other type of glass suitable for multiple glazed units of the character herein disclosed, such as glass having patterned, etched or configurated surfaces, or a unit having a pane of drawn sheet or plate on one side, and a pane of heat absorbing glass on the other side. The internal marginal edge surfaces of the said glass panes are indicated by the numeral 22, the external marginal edge surfaces thereof are designated by the numeral 23, and the perimetrical edges thereof are designated by the numeral 24.

A spacer frame, generally indicated by the numeral 25, is interposed between the internal marginal edge surfaces 22 of the glass panes 20. The said spacer frame may comprise four tubular-shaped sections, designated by the numeral 26 in FIGURE 1, the ends of which are mitered at an angle of forty-five degrees, as is indicated by the dotted line 27 in FIGURE 3. The sections 26 of the spacer frame 25 are preferably rolled-formed and made from light gauge sheet aluminum, stainless steel or othes suitable material, possessing permanent resiliency and flexibility of such order that the separator frame 25 may be slightly compressed at unit assembly when the edges of the two glass panes 20 are urged one towards the other, so as to enable hand application of the metal edge channels of the unit, hereinafter referred to in greater detail. The gauge thickness of the spacer frame sections 26 may generally be in a range between .008″ and .025″, depending upon the characteristics of the sheet metal forming the said sections. Each said section is of similar cross-sectional shape and comprises outwardly flaring sides 28, rounded corners 29 and inwardly extending flanges 30 and 31, which overlap in closely spaced relation with a space 32 therebetween, through which moisture vapour may ingress into the said sections and be absorbed by the dehydrating substance 33.

Prior to assembly of the four sections 26 of the spacer frame 25, the said sections are all preferably approximately filled with a suitable moisture vapour dehydrating substance or desiccant 33, for example silica gel of granular formation, substantially free from fine particles. A soft packing material such as cotton batting, indicated by the numeral 34 in FIGURE 3, may be placed in each end of the tubular sections 26, to prevent spilling out of the dehydrating substance 33 during the ensuing assembly operations.

The primary edge seals are then applied to the spacer frame tubular sections 26, prior to unitary assembly of the said spacer frame. Each said seal comprises a strip, ribbon or tape 35 of flexible material, preferably of transparent plastic, for example polyethylene, between .003" and .006" in thickness. A film or strip of adhesive compound 36 is extruded on to the tape 35, substantially in the formation shown in FIGURE 4. The strip of adhesive sealing compound 36 may be of any formulation suitable for the purpose of providing permanently resilient substantially moisture proof adhesive seals between the sides 28 of the spacer frame sections 26 and the confronting internal marginal edge surfaces 22 of the glass panes 20. The adhesive sealing compound used for this purpose shall preferably be selected from that group of sealing compounds which possess a very low rate of moisture vapour diffusion; which are non-hardening and non-volatile; which do not excessively deteriorate as a result of exposure to ultra-violet rays; and which possess substantially negative plastic or cold flow characteristics in an atmospheric temperature range up to 150° F. Sealing compounds possessing the aforesaid desirable characteristics may be formulated by incorporating carbon black with polyisobutylene in appropriate proportions. It is desirable that such sealing compound be sufficiently pliable to permit its deformation from the strip shape shown in FIGURE 7 to the film shape shown in FIGURE 11, upon application of pressure of from one to five pounds per lineal inch of film compound against one glass pane 20.

The strip of adhesive sealing compound 36 may be machine extruded on to the flexible material tape 35, following which suitable lengths of the seal tape so formed may be cut off. The length of each said seal tape shall preferably be slightly longer than the tubular section 26 to which it is applied. Each said seal tape shall be applied to each tubular section 26 in the form shown in FIGURE 7. This assembly operation may be rapidly and accurately performed by progressive mechanical roll application, or by mechanical press application. In the latter method of application, the applicator machine may embody a bed having a central stripper, which combinatively will accurately align and support the tape 35 in the flat form shown in FIGURE 4. A tubular section 26 may be detachably supported by a vertically reciprocatable ram head which, when lowered, will cause the said tubular section to contact the strip of adhesive sealing compound 36, depress the tape 35 into the machine bed, and deform the said tape and strip of adhesive compound 36 to the applied shape shown in FIGURE 7. As the machine ram head raises, the said machine bed stripper will support the said tape until it is clear of the machine bed, following which operation the tubular section 26 and applied tape may be removed from the machine ram head and the operation may be repeated. This method of mechanical application is outlined to exemplify how the tapes 35 may be rapidly and accurately applied to the tubular sections 26, with a minimum of handling and manual skill. Any other suitable method of application may be used. Following such application, the projecting ends of the tapes 35 and adhering sealing compound 36 shall be sheared off to substantially conform to the shape of the mitered ends 27 of the tubular sections 26.

The four tubular sections 26 with applied seal tapes 35 and adhesive sealing compound 36 may be assembled into unitary spacer frame formation, by insertion of a suitable corner connector 37 in each corner of the spacer frame 25, one of which is shown in sectional elevation in FIGURE 3. These corner connectors may be made of any suitable material such as semi-rigid polyethylene plastic, having flexible and depressible ribs 38, and shall be of such shape as to permit deformation of the tubular sections 26 from the cross-sectional shape shown in FIGURE 7 to the cross-sectional shape shown in FIGURES 2 and 11, upon complete assembly of the glazed unit. After assembly of the four spacer frame tubular sections 26 and related components as above defined, the ends of the tapes 35, at each corner of the spacer frame, may be pressed to cause the adhesive sealing compound 36 to merge together, or if required, the mitered ends of the tapes may be covered by hand tool application of additional adhesive sealing compound 36, which should be preheated to facilitate its application.

Assembly of the spacer frame 25 with applied tapes 35 and adhesive sealing compound 36, between the internal marginal edge surfaces 22 of the glass panes 20, may be carried out with the said glass panes in vertical, inclined or horizontal position. Where the size and deflection characteristics of the said glass panes are such that the force of gravity does not cause excessive downward deflection of the said glass panes, the glazed units may be assembled in a horizontal plane, such as is pictorially illustrated in FIGURES 8 to 11 inclusive.

Figure 8:
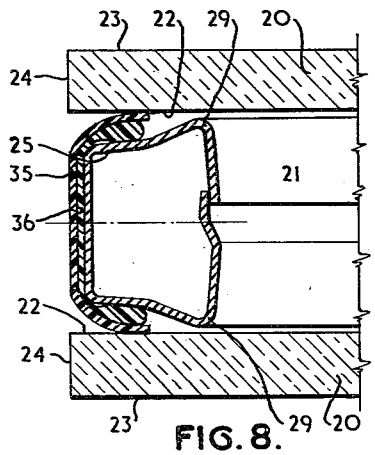
FIGURE 8 is a cross-sectional edge view illustrating the step of assembly of the spacer frame between the two glass panes.

Referring now to FIGURE 8, the lower glass pane 20 may be supported on an assembly table or bench, or on any other appropriate means. The completely assembled spacer frame 25 is then placed on the said lower glass pane and may be very easily shifted and aligned with the edges 24 thereof. The upper glass pane 20 is then placed on top of the said spacer frame assembly, and since it bears upon the flexible material seal tape 35, which is preferably of plastic material, the said top glass pane may be easily adjusted to establish approximate alignment of the edges 24 of both said glass panes and the tapes 35 of the said spacer frame assembly.

Figure 9:
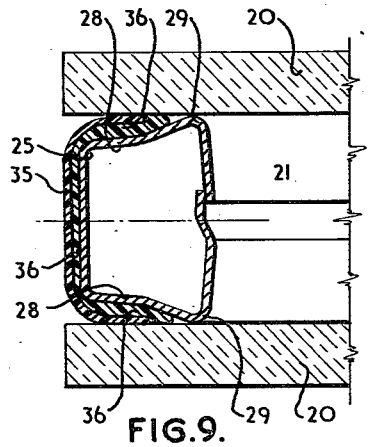
FIGURE 9 is a view similar to FIGURE 8, showing a third step of unit assembly.

After assembly as above defined, the top glass pane 20 may be urged downwardly by hand or applied mechanical pressure thereby effecting deformation of the adhesive sealing compound 36 to approximately the shape shown in FIGURE 9, wherein portions of the said compound are shown extruded from between the sides 28 of the tubular sections 26 and the tapes 35 on to adjacent internal marginal edge surfaces 22 of the said glass panes, and the rounded corners 29 of the tubular sections 26 are shown in contact with the said glass surfaces.

Figure 10:
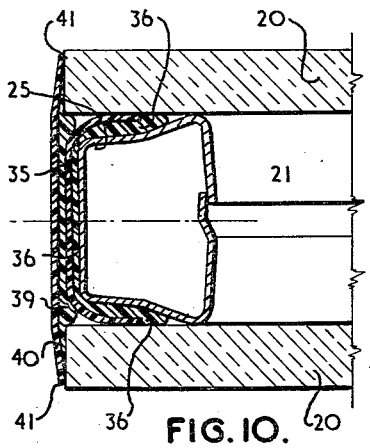
FIGURE 10 is a view similar to FIGURE 9, showing the secondary seal illustrated in FIGURE 5 applied to edges of the glass panes, in the fourth step of assembly.

Referring now to FIGURE 10, following the aforesaid assembly step, the perimetrical edge of the unit is preferably sealed by a secondary seal comprising a film of adhesive sealing compound 39 which has been machine extruded on to a strip, ribbon or tape 40 of flexible material, preferably of transparent plastic, for example polyethylene, between .003" and .006" in thickness. The said adhesive sealing compound may be of any formulation suitable for the purpose of providing a permanently resilient substantially moisture proof edge seal. The adhesive sealing compound used for this purpose shall preferably be selected from that group of sealing compounds which possess a very low rate of moisture vapour diffusion; which are non-hardening and non-volatile; which do not excessively deteriorate as a result of exposure to ultra-violet rays; and are soft and tacky and provide intimate sustained adhesion to glass. Sealing compounds possessing the aforesaid characteristics may be formulated by incorporating carbon back in polyisobutylene in appropriate portions. It is desirable that the particle size and weight proportion of carbon black in the formulation be such that the compound be relatively soft and pliable, in comparison with the aforesaid adhesive sealing compound 36. Such plasticity is desirable to facilitate application of the said compound, substantially in the form shown in FIGURE 10, and to enable overlapping of the ends of the tapes 40 and adhering adhesive sealing compound 39, to provide properly sealed lapped joints. The tape 40 may be a continuous ribbon with one overlapping joint, or a plurality of tape lengths may be applied, particularly where large units of over 120 united inches are manufactured. Furthermore, after application, it is desirable that the edges of the tape 40 be pressed or rolled downwardly to progressively decrease the thickness of the adhesive sealing compound 39 towards the outside corners of the glass edges 24, so as to provide minimum exposure of the films of adhesive sealing compound 39, along the film edges indicated in FIGURE 10 by the numeral 41.

By using tape or tapes 40 formed of transparent polyethylene, the seal provided by the adhesive sealing compound 39 may be visually inspected with facility, to determine the adequacy thereof. Furthermore, polyethylene has excellent adhesive affinity with polyisobutylene sealing compounds of appropriate formulation as above referred to, and adequate overlapping joints at ends 42 of the said tapes, as is exemplified in FIGURE 3, may be easily made.

In the preferred form of the invention, the aforesaid perimetrical edge seal is protected by overlying channel-shaped metal edging, which may comprise a plurality of edge channels designated in FIGURE 1 by the numerals 43, having abutting mitered ends 44. These edge channels are preferably made of sheet stainless steel of appropriate gauge, for example, from .010″ to .030″ in thickness for glazed units up to 180 united inches. Obviously, materials of other gauges or alloys may be used to suit specific requirements, or materials other than sheet metal may be used. The space between the edge channel flanges designated by the dimension line A in FIGURE 4 should be slightly less than the outside or overall width of the glass panes 20, in the assembled form shown in FIGURE 10.

Figure 6:
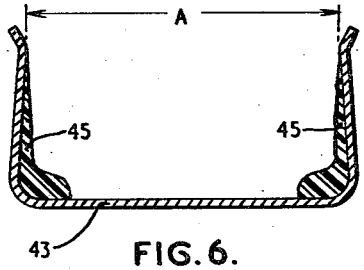
FIGURE 6 is a cross-section of the unit metal edge channel, with films of adhesive sealing compound applied thereto.

A third moisture vapour diffusion seal may be provided by coating the internal flange surfaces of the said edge channels 43 with films of adhesive sealing compound 45, shown in FIGURE 6, prior to application of the said edge channels to the edges of the glass panes 20. The inside transverse ends of the webs of the said edge channels should be buttered with compound 45, so that when the said edge channels are applied to the edges of the glass panes, each internal corner of the unit assembly shall be sealed with compound 45, as is shown in FIGURE 3. The adhesive sealing compound 45 may be a thermo-plastic formulation of poly-sulphide-Thiokol. Such a compound possesses the characteristics of strong and durable adhesion to glass and metal, permanent elasticity and desirable cohesion factors, combined with a low rate of moisture vapour diffusion. It sets to a durometer Shore A hardness of between 10 and 30 and remains resilient in a wide range of atmospheric temperature differentials. Any compound possessing equal or otherwise suitable characteristics may be used for bonding the outside marginal edge surfaces 23 of the glass panes 20 to the internal flange surfaces of the edge channels 43.

Figure 11:
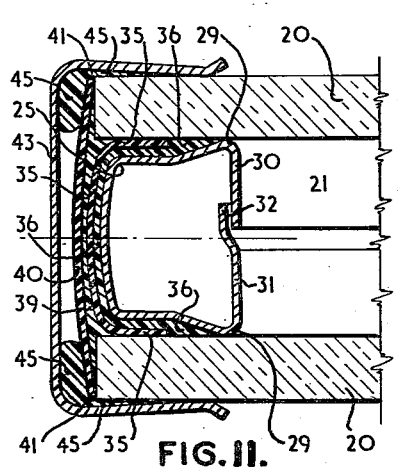
FIGURE 11 is a view similar to FIGURE 10, showing the final step of unit assembly, including the metal edge channel and applied films of adhesive sealing compound, shown in FIGURE 6.

In the final step of assembly, the flexible sheet metal tubular sections 26 forming the spacer frame 25, may be compressed or deformed from the shape shown in FIGURE 10 to the shape shown in FIGURE 11, to facilitate application of the edge channels 43 and accommodate variations in the thickness of the glass panes 20, which may be found in most commercial grades of sheet glass. The edges of the glass panes 20 shall preferably be urged one towards the other, thereby causing the films of adhesive sealing compound 36 to spread slightly to the formation shown in FIGURES 2 and 11, and attain maximum sealing value. The material forming the edge channels 43 and the design characteristics thereof shall preferably be such that the tubular sections 26 of the spacer frame 25 shall be retained in compression, in the formation shown in FIGURES 2 and 11, with the rounded corners 29 thereof in line contact with the internal marginal edge surfaces 22 of the glass panes 20.

For the purposes of clarity, the dehydrating substance 33 is not shown in FIGURES 7 to 11 inclusive, but it shall be understood that all or part of the tubular sections 26 of the spacer frame 25 may be charged with a suitable amount of such dehydrating substance.

The principles of this invention may be embodied in a wide range of insulating glass unit types, in a variety of shapes, comprising two or more glass panes. The definition "parallel relation" of glass panes shall be interpreted as meaning "approximate parallel relation" in that it is obviously inconsistent with standard production techniques to consistently assemble pluralities of glass panes in precise parallelism.

The form of the invention herewith shown and described shall be construed as illustrative of one preferred embodiment only, and that various changes in the shape, size and arrangement of the components may be resorted to without departing from the spirit of the invention or the scope of the subjoined claims.

What I claim as new is:

1. A multiple glass pane glazing unit comprising two glass panes arranged in parallel spaced relation, a spacer frame interposed between marginal edge surfaces of the said glass panes, adhesive sealant between each side of the said spacer frame and the adjacent glass pane, and flexible material overlying surfaces of the said spacer frame and portions of the said adhesive sealant and lying entirely within the peripheral edges of said panes, being interposed in part between each said glass pane and portions of the said adhesive sealant.

2. A multiple glass pane glazing unit as defined in claim 1, wherein the said spacer frame, at least in part coated with adhesive sealant with overlying flexible material, is formed of flexible sheet metal tubing and is partially compressed between the said glass panes.

3. A multiple glass pane glazing unit as defined in claim 1, wherein the said spacer frame includes four flexible sheet metal tubular-shaped members forming line contact with the said glass panes inwardly of said adhesive sealant and overlying flexible material.

4. A multiple glass pane glazing unit as defined in claim 1, wherein the said adhesive sealant and said flexible material extend about the greater part of the external periphery of the said spacer frame.

5. A multiple glass pane glazing unit comprising two glass panes arranged in parallel spaced relation, a spacer frame interposed between internal marginal edge surfaces of the said glass panes, a film of adhesive sealant between each side of the said spacer frame and the confronting marginal edge surfaces of each adjacent glass pane, flexible material of strip formation overlying outside edges of the said spacer frame and portions of the said adhesive sealant and interposed in part between the said internal marginal edges of the said glass panes and the said adhesive sealant, and a moisture vapour seal covering overlying part of the said flexible material and intimately contacting edges of the said glass panes.

6. A multiple glass pane glazing unit comprising two glass panes arranged in parallel spaced relation, a spacer frame interposed between the internal marginal edge surfaces of the said glass panes, a film of adhesive sealant between each side of the said spacer frame and each adjacent glass pane, flexible material of ribbon formation overlying outside edges of the said spacer frame and portions of the said adhesive sealant and interposed in part between the said internal marginal edge surfaces of the said glass panes and the said adhesive sealant, a film of permanently elastic adhesive sealing compound overlying part of the said flexible material and edge surfaces of the said glass panes forming a moisture vapour seal around the perimeter of the said glass panes, and additional flexible material overlying the last said sealing compound.

7. A multiple glass pane glazing unit comprising two glass panes arranged in parallel spaced relation, a spacer frame interposed between the internal marginal edge surfaces of the said glass panes, an adhesive film between each side of the said spacer frame and each adjacent glass pane, flexible material of ribbon formation overlying outside edges of the said spacer frame and portions of the said adhesive films and interposed in part between the said internal marginal edge surfaces of the said glass panes and the said adhesive films, a film of permanently elastic adhesive sealing compound overlying part of the said flexible material and edge surfaces of the said glass panes forming a moisture vapour seal extending around the perimeter of the said glass panes, additional flexible material overlying the greater part of the said sealing compound, and rigid metal edging overlying the last said flexible material.

8. A multiple glass pane glazing unit comprising two glass panes arranged in parallel spaced relation, a permanently flexible tubular spacer frame interposed between the internal marginal edge surfaces of the said glass panes, said frame near its inner edge having line contact with said panes, an adhesive film between each side of the said spacer frame and each adjacent glass pane, flexible material of tape formation overlying outside edges of the said spacer frame and portions of the said adhesive films and interposed in part between the said internal marginal edge surfaces of the said glass panes and the said adhesive films, said adhesive films and flexible material being disposed outside of the line contact of said spacer frame with said panes, and said spacer frame, adhesive films and flexible material all lying entirely within the peripheral edges of said panes, a film of permanently elastic adhesive sealing compound overlying part of the said flexible material and edge surfaces of the said glass panes forming a moisture vapour seal around the perimeter of the said glass panes, additional flexible material overlying the greater part of the said sealing compound, rigid metal edging overlying the last said flexible material, and permanently elastic adhesive compound bonding the said rigid metal edging to external marginal edge surfaces of the said glass panes.

9. A method of fabricating a multiple glass pane glazing unit that comprises two glass panes arranged in parallel spaced relation with a spacer frame interposed between confronting marginal edge surfaces of the said glass panes, which includes the steps of applying adhesive compound supported by flexible tape along the outermost surface and each side adjacent thereto of the said spacer frame, placing the said spacer frame and adhering adhesive compound and flexible tape between confronting marginal edge surfaces of the said glass panes, pressing one said glass pane towards the other said glass pane thereby deforming the said adhesive compound and flexible tape to a position between the panes and the frame and effectuating a seal between the said glass panes and the said spacer frame, and applying a second seal to edges of the said glass panes.

10. A method of fabricating a multiple glass pane glazing unit that comprises two glass panes arranged in parallel spaced relation with a spacer frame interposed between confronting marginal edge surfaces of the said glass panes, which includes the steps of applying adhesive compound supported by flexible tape along the outermost surface and each side adjacent thereto of the said spacer frame, placing the said spacer frame and adhering adhesive compound and flexible tape between confronting marginal edge surfaces of the said glass panes, pressing one said glass pane towards the other said glass pane thereby deforming the said adhesive compound and flexible tapes to a position between the panes and the frame and effectuating a seal between the said glass panes and the said spacer frame, applying a second seal to peripheral edges of the said glass panes, and applying metal edging over said second seal.

11. A method of fabricating a multiple glass pane glazing unit that comprises two glass panes arranged in parallel spaced relation with a spacer frame interposed between confronting marginal edge surfaces of the said glass panes, which includes the steps of applying adhesive compound supported by flexible tape along the outermost surface and each side adjacent thereto of the said spacer frame, placing the said spacer frame and adhering adhesive compound and flexible tape between confronting marginal edge surfaces of the said glass panes, pressing one said glass pane towards the other said glass pane thereby deforming the said adhesive compound and flexible tape to a position between the panes and the frame and forcing the said adhesive compound into contact with the said glass panes, and applying a second seal to peripheral edges of the said glass panes.

12. A method of fabricating a multiple glass pane glazing unit that comprises two glass panes arranged in parallel spaced relation with a flexible metal spacer frame interposed between confronting marginal edge surfaces of the said glass panes, which includes the steps of applying adhesive compound supported by overlying flexible tape around the outermost surface and each side adjacent thereto of the said spacer frame, placing the said spacer frame and adhering adhesive compound and flexible tape between confronting marginal edge surfaces of the said glass panes, urging marginal edges of one said glass pane towards marginal edges of the other said glass pane thereby compressing the said flexible metal spacer frame and deforming the said adhesive compound and flexible tape into a position between the panes and the frame and in contact with marginal edge surfaces of the said glass panes and forming a seal between the said glass pane surfaces and sides of the said spacer frame, and applying edging to the periphery of the said unit.

13. A method of fabricating a multiple glass pane glazing unit that comprises two glass panes arranged in parallel spaced relation with a flexible metal spacer frame interposed between confronting marginal edge surfaces of the said glass panes, which includes the steps of applying adhesive compound supported by overlying flexible tape around the outermost surface and each side adjacent thereto of the said spacer frame, placing the said spacer frame and adhering adhesive compound and flexible tape between confronting marginal edge surfaces of the said glass panes, urging marginal edges of one said glass pane towards marginal edges of the other said glass pane thereby compressing the said flexible metal spacer frame and deforming the said adhesive compound and flexible tape into a position between the panes and the frame and in contact with marginal edge surfaces of the said glass panes and forming a seal between the said glass pane surfaces and sides of the said spacer frame, applying a second seal to peripheral edges of the said glass panes, and applying edging over the last said seal.

References Cited in the file of this patent

UNITED STATES PATENTS

| | | |
|---|---|---|
| 2,173,649 | Firner | Sept. 19, 1939 |
| 2,303,125 | Knight | Nov. 24, 1942 |
| 2,306,327 | Baldwin et al. | Dec. 22, 1942 |
| 2,838,810 | Englehart et al. | June 17, 1958 |